US009860459B2

(12) United States Patent
Barbee et al.

(10) Patent No.: US 9,860,459 B2
(45) Date of Patent: Jan. 2, 2018

(54) SIGNALING DEVICE FOR AN OBSCURED ENVIRONMENT

(71) Applicant: Scott Technologies, Inc., Boca Raton, FL (US)

(72) Inventors: Wesley Mcchord Barbee, Oakboro, NC (US); Richard Sabacinski, Charlotte, NC (US); Jerry Allen Phifer, Peachland, NC (US)

(73) Assignee: Scott Technologies, Inc., Boca Raton, FL (US)

( * ) Notice: Subject to any disclaimer, the term of this patent is extended or adjusted under 35 U.S.C. 154(b) by 0 days.

(21) Appl. No.: 14/853,092

(22) Filed: Sep. 14, 2015

(65) Prior Publication Data

US 2016/0006953 A1    Jan. 7, 2016

Related U.S. Application Data

(63) Continuation of application No. PCT/US2014/027784, filed on Mar. 14, 2014.
(Continued)

(51) Int. Cl.
*H04N 5/33* (2006.01)
*G08B 7/06* (2006.01)
(Continued)

(52) U.S. Cl.
CPC ............. *H04N 5/33* (2013.01); *A62B 99/00* (2013.01); *A62C 5/00* (2013.01); *G01S 1/70* (2013.01);
(Continued)

(58) Field of Classification Search
CPC ................ H04N 5/33; G01S 1/70; G08B 7/06
See application file for complete search history.

(56) References Cited

U.S. PATENT DOCUMENTS 7,005,980 B1    2/2006  Schmidt et al.
7,626,506 B2   12/2009  Antonio, II et al.
(Continued)

FOREIGN PATENT DOCUMENTS

GB            2318939 A       5/1998
KR    10-2004-0018308 A       3/2004
WO         2006083931 A1      8/2006

*Primary Examiner* — Casey Bryant
(74) *Attorney, Agent, or Firm* — Christopher & Weisberg, P.A.

(57) ABSTRACT

A portable signaling device for use in a reduced visibility environment. The signaling device includes a housing for carrying the signaling device into the reduced visibility environment, the housing having a signaling side and an attachment side, the signaling side configured to transmit an infrared signal and the attachment side configured to be secured to a structure within the environment, and an infrared energy source located within the housing, the infrared energy source including a power source, an emitter connected to the power source, and a switching mechanism connected to the power source and the emitter. The signaling device also includes a control circuit coupled to the infrared energy source, the control circuit configured to receive an input representing a message to be transmitted to a thermal imaging camera being carried by a first responder, the message providing a visual indication of a firefighting operation, and operate the infrared energy source to transmit the infrared signal representing the message to the thermal imaging camera.

20 Claims, 6 Drawing Sheets

Related U.S. Application Data

(60) Provisional application No. 61/794,344, filed on Mar. 15, 2013.

(51) Int. Cl.
*G08B 5/22* (2006.01)
*A62B 99/00* (2009.01)
*G01S 1/70* (2006.01)
*A62C 5/00* (2006.01)

(52) U.S. Cl.
CPC ............... *G08B 5/22* (2013.01); *G08B 7/066* (2013.01); *G08B 7/062* (2013.01)

(56) References Cited

U.S. PATENT DOCUMENTS

| | | |
|---|---|---|
| 2004/0113817 A1 | 6/2004 | Novak et al. |
| 2005/0200487 A1 | 9/2005 | O'Donnell et al. |
| 2006/0132323 A1* | 6/2006 | Grady ..................... G08B 5/36 340/815.45 |
| 2006/0216011 A1 | 9/2006 | Godehn |

* cited by examiner

SIGNALING DEVICE FOR AN OBSCURED ENVIRONMENT

CROSS-REFERENCE TO RELATED APPLICATION

This application is a continuation of International Patent Application No. PCT/US2014/027784 filed Mar. 14, 2014 and is entitled to the benefit of, and claims priority to, provisional U.S. Patent Application Ser. No. 61/794,344 filed Mar. 15, 2013. The contents of both of the above-referenced applications are incorporated herein by reference in their entirety.

BACKGROUND OF THE INVENTION

The subject matter disclosed herein relates generally to signaling in obscured environments, and more particularly to a signaling device that may be used by first responders in a smoke filled building.

First responders, such as firefighters, are often relied upon to extinguish fires in buildings or other structures. Additionally, the firefighters are relied upon to rescue persons within the buildings. However, fires typically generate smoke that reduces the visibility within the building and therefore also may reduce the ability of the firefighters to navigate within the building to either extinguish the fire and/or to rescue persons trapped within the building.

Accordingly, thermal imaging cameras are gaining widespread use, particularly by the firefighting community for use within buildings that are experiencing reduced visibility caused by, for example, smoke. In operation, thermal imaging cameras enable the firefighters to operate in various environments wherein the firefighter's vision may be obscured because of the smoke and/or other materials entrained in the air. Thermal imaging cameras operate in the infrared light spectrum and therefore provide an alternative view to firefighters by enabling the firefighters to "see" in the reduced visibility environment. More specifically, temperature differences between various objects in the building are highlighted and transformed into a visible image on a display that forms part of the thermal imaging camera. The visible images enable the firefighters to navigate throughout the building. The visible images also enable the firefighters to locate a prone or injured person within the building. Thermal imaging cameras further enable a firefighter to locate a "hot spot" that may be obscured by walls or furniture so that an extinguishing agent may be utilized to eliminate the hot spot.

However, thermal imaging cameras do not enable the firefighter to identify rooms within the building that have been previously entered by firefighters to rescue persons or to extinguish fires. Thus, traditional methods are used to mark or identify areas where a firefighter has already entered or searched. For example, one traditional method of marking a previously searched room or area includes positioning a chock outside the room. Another traditional method of marking a previously searched room includes etching a tool mark on the door of the previously searched room. The use of chocks and tool marks therefore provide an initial visual indication to firefighters that the room should not be searched again. However, the as the temperature of the chocks and tool marks approach the temperature of their surroundings within the building, the chocks and tool marks may become less visible in the images generated by the thermal imaging camera. Thus, over time the effectiveness of the chocks and tool marks may decrease and fail to serve their intended purpose.

BRIEF DESCRIPTION OF THE INVENTION

In one embodiment, a portable signaling device for use in a reduced visibility environment is provided. The signaling device includes a housing for carrying the signaling device into the reduced visibility environment, the housing having a signaling side and an attachment side, the signaling side configured to transmit an infrared signal and the attachment side configured to be secured to a structure within the environment, and an infrared energy source located within the housing, the infrared energy source including a power source, an emitter connected to the power source, and a switching mechanism connected to the power source and the emitter. The signaling device also includes a control circuit coupled to the infrared energy source, the control circuit configured to receive an input representing a message to be transmitted to a thermal imaging camera being carried by a first responder, the message providing a visual indication of a firefighting operation, and operate the infrared energy source to transmit the infrared signal representing the message to the thermal imaging camera.

In another embodiment, a thermal imaging system is provided. The thermal imaging system includes a signaling device that includes a housing for carrying the signaling device into the reduced visibility environment, the housing having a signaling side and an attachment side, the signaling side configured to transmit an infrared signal and the attachment side configured to position the housing in a given location. The signaling device also includes an infrared energy source located within the housing, the infrared energy source including a power source, an emitter connected to the power source, and a switching mechanism connected to the power source and the emitter and a control circuit coupled to the infrared energy source, the control circuit configured to receive an input representing a message to be transmitted to a remote location. The thermal imaging system also includes a thermal imaging camera configured to receive and display the message.

In a further embodiment, a method of transmitting a message in a reduced visibility environment is provided. The method includes positioning a signaling device at a first location within the reduced visibility environment, the signaling device including an infrared emitter and a control circuit coupled to the infrared emitter, activating a power source within the signaling device, inputting a message to be transmitted by the signaling device into the signaling device, the message indicating a status of a firefighting operation, and operating the infrared emitter to transmit an infrared signal that represents the message.

DETAILED DESCRIPTION OF THE INVENTION

The following detailed description of certain embodiments will be better understood when read in conjunction with the appended drawings. To the extent that the figures illustrate diagrams of the functional modules of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments provide apparatuses and methods for signaling in an environment where visible light may be unavailable or absent. For example, one such environment includes a building or structure wherein a person's vision may be obscured because of smoke and/or other materials entrained in the air. More specifically, the various apparatuses and methods provide a signaling device that emits an infrared (IR) signal that may be detected by a thermal imaging receiver, such as a thermal imaging camera in a low visibility environment. As used herein, a low visibility environment is an environment wherein there is substantially no visible light such that there is approximately zero visibility to the human eye. As used herein, visible light is a range of electromagnetic radiation that can be detected by the human eye. The wavelengths associated with the visible light range are approximately 380 nm to approximately 750 nm. (1 nm=$10^{-9}$ m)

In various embodiments, the signaling device is embodied as portable apparatus that may be carried by a first responder into the building. In operation, the signaling device emits an infrared signal that may be received by a thermal imaging camera. In some embodiments, the signaling device is configured as a disposable apparatus that is intended to be discarded after a single use. More specifically, the signaling device includes a battery pull tab for activating a disposable battery. After the power within the disposable battery is exhausted, the signaling device may be discarded.

In other embodiments, the signaling device is configured as a reusable apparatus that is intended to be utilized multiple times. More specifically, the signaling device includes a rechargeable battery that may be recharged after each use. Optionally, the signaling device may include a removable battery pack that may be replaced with a fully charged battery pack after each use.

In operation, the signaling device is configured to transmit an IR signal that is detectable by the thermal imaging camera. In various embodiments, the IR signal is configured to provide information to the first responder to enable the first responder to more effectively search a building having a reduced visibility. For example, the IR signal transmitted by the signaling device may represent that a room has been previously searched, referred to herein as an "all clear" indication. Additionally, the signal transmitted by the signaling device may represent that the room has not been previously searched, fires within the room have been extinguished, persons have been removed from the room, etc. Moreover, the IR signal may provide information relating to the firefighting unit or battalion which searched the room. The IR signal may also provide information regarding the location of the room within the building. Thus, the IR signal transmitted by the signaling device may be utilized by the thermal imaging camera to generate a visual indication that may be embodied as a symbol or objects related to the responder organization and/or operate behind a mask representing a symbol.

Figure 1:
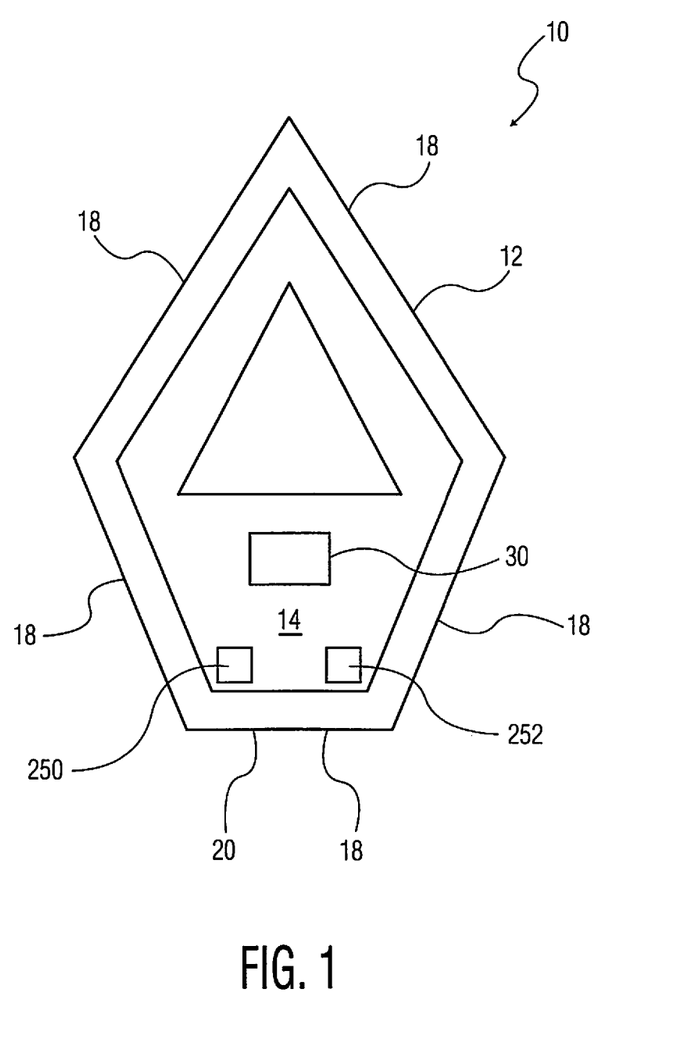
FIG. 1 illustrates a front view of an exemplary signaling device formed in accordance with various embodiments.
Figure 2:
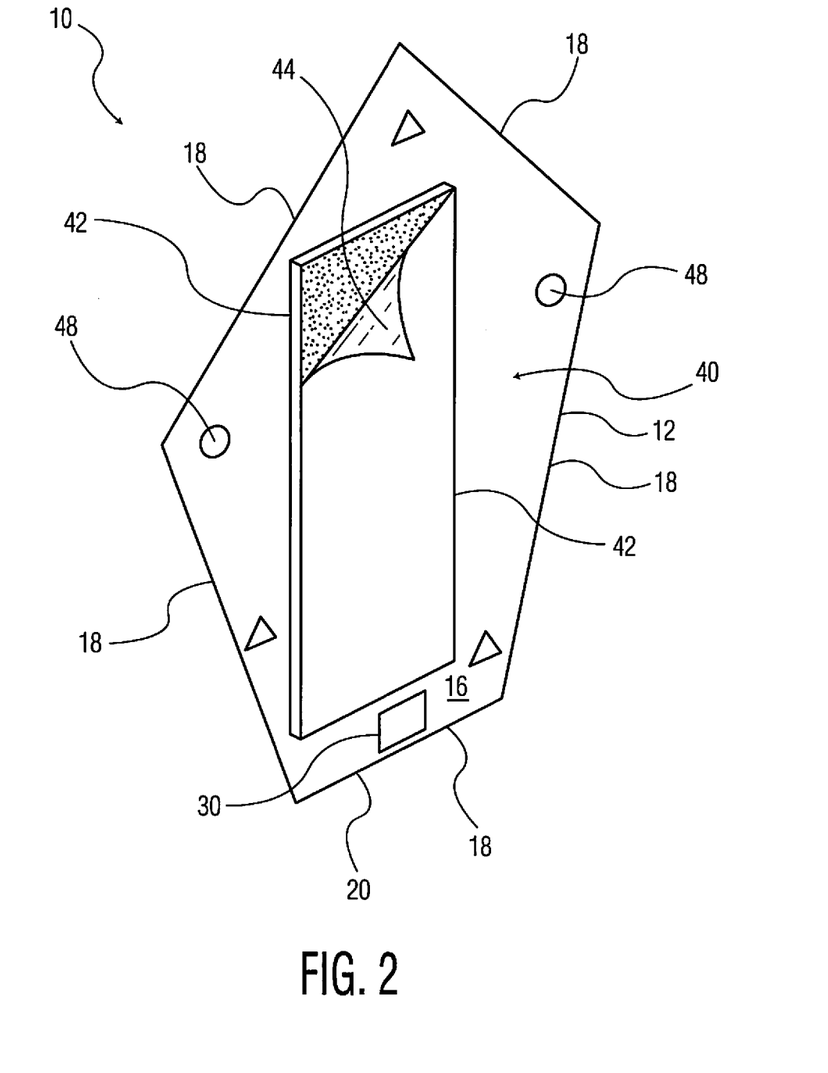
FIG. 2 illustrates a rear view of the exemplary signaling device shown in FIG. 1 and formed in accordance with various embodiments.
Figure 3:
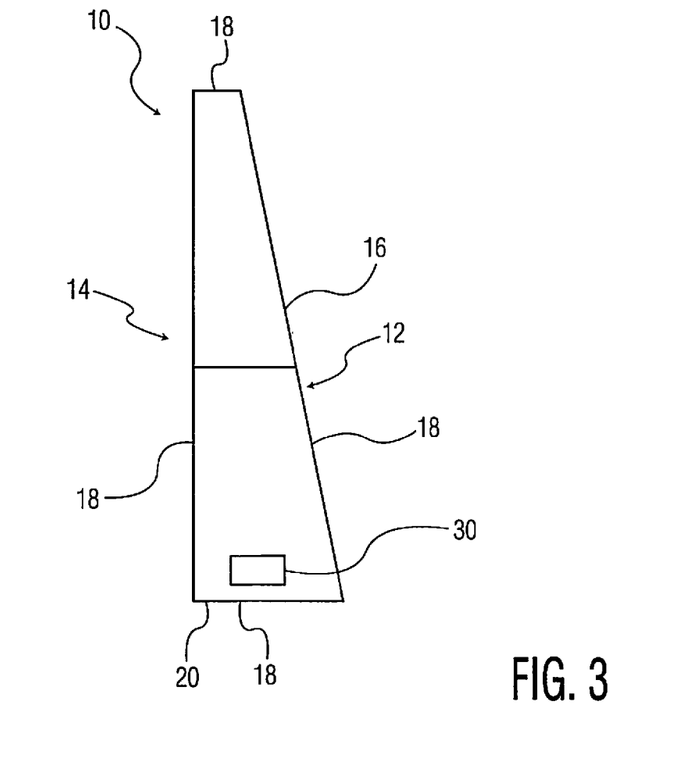
FIG. 3 illustrates a side view of the exemplary signaling device shown in FIG. 1 and formed in accordance with various embodiments.

FIG. 1 illustrates a front view of a signaling device 10 that is formed in accordance with various embodiments. FIG. 2 illustrates a rear view of the signaling device 10 shown in FIG. 1 and formed in accordance with various embodiments. FIG. 3 illustrates a side view of the signaling device 10 shown in FIG. 1 and formed in accordance with various embodiments. It should be realized that while the signaling device 10 shown in FIGS. 1-3 includes a substantially pentagon shaped signaling device, the signaling device 10 may be fabricated to have any shape and the shape shown in FIG. 1 is exemplary only. For example, the signaling device 10 may be fabricated to have a rectangular shape or a square shape such that the IR signal generated by the signaling device has a pattern of approximately 180 degrees. The signaling device 10 may also be fabricated to have a cylindrical shape such that the IR signal generated by the signaling device has a pattern of approximately 360 degrees. In the exemplary embodiment, the signaling device 10 has a weight and volume that is sufficiently small to enable the emergency responder to easily carry a plurality of signaling devices 10 into a structure. For example, the signaling device 10 may have a volume of, for example, 4"×6"×3". Moreover, the signaling device 10 may be configured to weigh less than approximately 8 oz Accordingly, in the illustrated embodiment, the signaling device 10 includes a housing 12 for carrying the signaling device 10 into a hazardous environment. The housing 12 is formed to include a signaling side 14, an attachment side 16, and a plurality of sidewalls 18. As used herein, the signaling side 14 is the side or face of the signaling device 10 that is configured to transmit the IR signal to a thermal imaging camera. The attachment side 16 is the side utilized to attach the signaling device 10 to a structure within a building, such as for example, a floor, a door, a ceiling, etc. In various embodiments, the housing 12 is fabricated from a fire or heat resistant material to enable the signaling device 10 to be utilized within a hazardous environment. Although the illustrated embodiment describes the attachment side 16 as being disposed opposite to the signaling side 14, it should be realized that a bottom surface 20 of the signaling device 10 may also be utilized to attach the signaling device 10 to a structure, such as a floor, ceiling or wall within the building.

Figure 4:
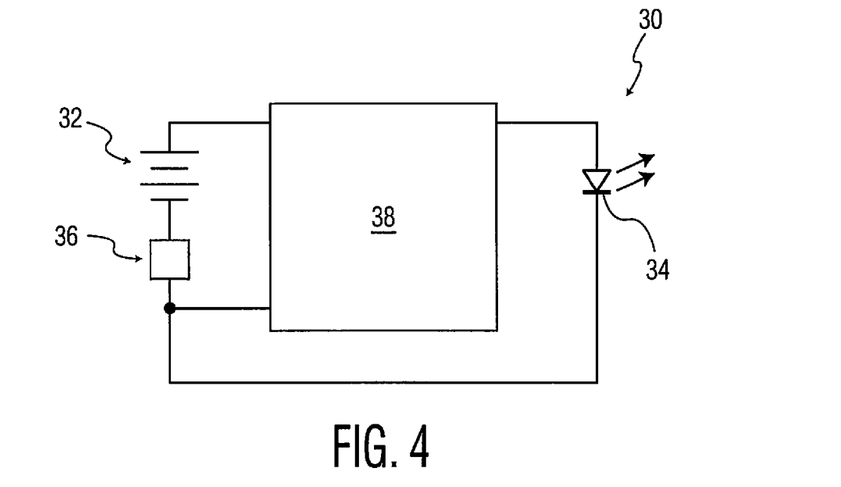
FIG. 4 is a simplified schematic illustration of an infrared transmitting circuit formed in accordance with various embodiments.

The signaling device 10 further includes an IR signal transmitting circuit 30 configured to generate and transmit an IR signal that may be received by a thermal imaging camera and then utilized to reconstruct various images as described in more detail below. FIG. 4 is a simplified schematic illustration of an exemplary IR signal transmitting circuit 30 that may be used with the signaling device 10 shown in FIGS. 1-3. In the illustrated embodiment, the circuit 30 includes a power source 32, and IR emitter 34, and a switching mechanism 36. The circuit 30 further includes a control circuit 38 for controlling the operation of the IR emitter 34. More specifically, the control circuit 38 is configured to activate and/or deactivate the IR emitter 34 such that the IR emitter 34 transmits an IR signal that is configured to attract the attention of the emergency personnel operating within the building. For example, microprocessor may be configured to generate a oscillating IR signal and/or a steady-state signal based on an input received by the control circuit 38 as is described in more detail below.

In one embodiment, the power source 32 is embodied as a disposable direct current (DC) battery having a limited useful lifespan. For example, the disposable battery may generate sufficient power to operate the signaling device 10 from approximately eight hours to approximately sixteen hours. In the exemplary embodiment, the disposable battery disposable battery generates sufficient power to operate the signaling device 10 for approximately twelve hours. It should be realized that the usable life of the disposable battery is based on the energy being consumed by the devices within the circuit 30. Thus, the useful life of the disposable battery may be less than eight hours our greater than sixteen hours. In various embodiments, the disposable battery is configured to be replaced with another disposable battery. Optionally, the disposable battery is non-replaceable. For example, in some embodiments, it is desirable to maintain the cost of the signaling device at a reduced level, thus the signaling device 10 in some embodiment is configured to be disposed after a single use. Thus, the DC battery may be configured to enable the signaling device 10 to be operated for a single use at which time the signaling device 10, including the disposable battery are discarded. In another embodiment, the power source 32 is embodied as a rechargeable DC battery that may be recharged after each use or recharged as needed.

In one embodiment, the IR emitter 34 may be embodied as a semiconductor device that is configured to emit an IR signal. For example, the IR emitter 34 may be embodied as a IR light emitting diode (LED). In another embodiment, the IR emitter 34 may be embodied as a high-resistance conductor that generates a heat induced IR signal. For example, the IR emitter 34 may be embodied, for example as a nickel-chromium wire conductor that generates a an IR signal based on the amount of energy transmitted through the conductor and thus the radiant energy generated by the conductor. In the exemplary embodiment, the IR emitter 34 is configured to emit an IR signal within the low infrared spectrum, e.g. signals having a wavelength from approximately 8 eight micrometers (μm) to approximately 14 μm.

In various embodiments, the switching mechanism 36 is configured to enable power to be transmitted from the power source 32 to the IR emitter 34 and the control circuit 38. More specifically, the switching mechanism 36 is configured to activate and/or deactivate the signaling device 10. In one embodiment, and a shown in FIG. 5A, the switching mechanism 36 is embodied as a contact mechanism 50. More specifically, the contact mechanism 50 includes a spring biased pair of contacts 52. In one operational configuration, the pair contacts 52 are maintained in an "open" position such that no power is transmitted from the power source 32 to the IR emitter 34 and the control circuit 38. More specifically, the contact mechanism 50 includes a pull tab 54 that is disposed between the pair of contacts 52. In operation, to activate the signaling device 10, the pull tab 54 is manually removed by the user to enable power to be transmitted from the power source 32 to the IR emitter 34 and the control circuit 38. In the exemplary embodiment, the pull tab 54 is fabricated from an electrically insulated material such that when the pull tab 54 is disposed between the pair of contacts 52, no power is transmitted from the power source 32 to the IR emitter 34 and the control circuit 38.

Figure 5A:
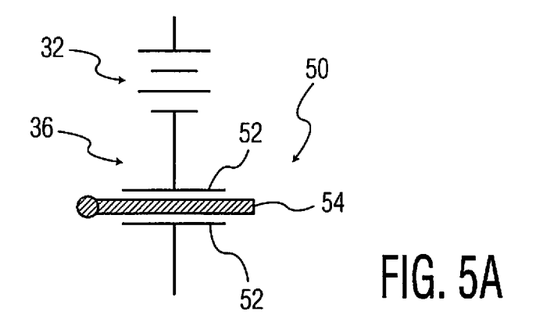
FIG. 5A is a simplified schematic illustration of a contact mechanism formed in accordance with various embodiments.

In another operational position, the pair of contacts 52 is operable in the "closed" position to enable power to be transmitted from the power source 32 to the IR emitter 34 and the control circuit 38. More specifically, when the pull tab 54 is removed from the signaling device 10, power is transmitted from the power source 32 to the IR emitter 34 and the control circuit 38. It should be realized that the contact mechanism 50 is configured to be utilized in a disposable signaling device. Thus, when the power from the power source 32 is exhausted, the signaling device 10 may be discarded.

Figure 5B:
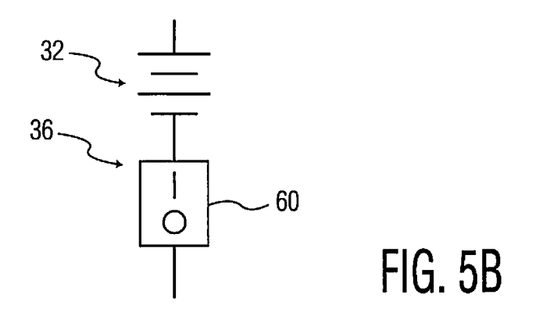
FIG. 5B is a simplified schematic illustration of another contact mechanism formed in accordance with various embodiments.

In another embodiment, and as shown in FIG. 5B, the switching mechanism 36 is embodied as an on/off switch 60. More specifically, when the on/off switch 60 is in a first or "on" operational position, power is transmitted from the power source 32 to the IR emitter 34 and the control circuit 38. Optionally, when the switch 60 is positioned in a different second operational position "off", power is not transmitted from the power source 32 to the IR emitter 34 and the control circuit 38.

Figure 5C:
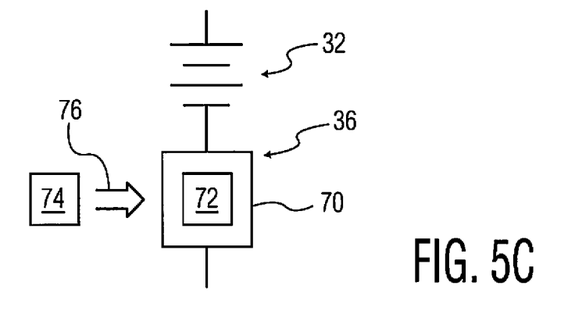
FIG. 5C is a simplified schematic illustration of a further contact mechanism formed in accordance with various embodiments.

In further embodiment, and as shown in FIG. 5C, the switching mechanism 36 may be embodied as a wireless device, such as for example a radio frequency (RF) switch 70. More specifically, the RF switch 70 includes an RF receiver 72 that is configured to receive an RF signal from an RF transmitter 74 that is located remotely from the RF switch 70. In operation, to activate the signaling device 10, an operator, such as a fire fighter, activates the RF transmitter 74 causing a wireless RF signal 76 to be transmitted to and received by the RF receiver 72. In operation, the RF receiver 72 closes a pair of contacts (not shown) to enable power to be transmitted from the power source 32 to the IR emitter 34 and the control circuit 38. Optionally, to deactivate the RF switch 70, the fire fighter transmits a second different signal to the RF receiver 72 to deactivate the signaling device 10. The RF transmitter 74 may be a separate device carried by the firefighter. Optionally, the RF transmitter 74 may form part of the thermal imaging camera.

In still further embodiments, the switching mechanism 36 may be embodied as a pair of magnetic contacts (not shown) that may be operated using, for example, a battery carried by the fire fighter or installed on the housing 12 of the signaling device 10. The switching mechanism 36 may also be activated using a portable light source that is carried by the firefighter or formed integrally with the thermal imaging camera.

Referring again to FIG. 3, as described above the signaling device 10 includes the attachment device 40 which is utilized to attach the signaling device 10 to a structure within a building, such as for example, a floor, a door, a ceiling, etc. More specifically, the attachment device 40 is configured to firmly anchor the signaling device 10 to a specific location as selected by the emergency personnel. In one embodiment, the attachment device 40 is embodied as an adhesive 42 that is initially protected or covered by a film or paper 44. In operation, when an emergency responder desires to attach the signaling device to a structure, the responder removes the paper 44 exposing the adhesive 42. The emergency responder than firmly presses the signaling device 10 to the structure such that the adhesive 42, and thus the signaling device 10, is firmly bonded to the structure. In some embodiments, the paper 44 may be formed unitarily with the pull tab 54 such that when an operator removes the paper 44, the pull tab 54 is also removed. Thus, the signaling device 10 may be activated and mounted in a single step.

In another embodiment, the attachment device 40 may be embodied as one or more projections or pointed spikes 46 that extend outwardly from the attachment side 16. In operation, when the emergency responder desires to attach the signaling device to a structure, the responder firmly presses the signaling device 10 until the pointed spikes 46 are embedded within the structure and thus the signaling device 10 is firmly coupled to the structure. It should be realized that the pointed spikes 46 described above are generally utilized to mount the signaling device 10 to a wooden structure and/or a structure covered in sheetrock.

In a further embodiment, the attachment device 40 may be embodied as one or more magnets 48 that extend outwardly from the attachment side 16. It should be realized that the magnets 48 described above are generally utilized to mount the signaling device 10 to a ferrous structure, such as for example, a metal door or metal beam.

Thus, the attachment devices 40 described above enable the signaling device 10 to be installed in a number of different orientations within the structure. Moreover, the attachment devices 40 also enable the signaling device 10 to be coupled to a plurality of different structures formed from a plurality of different materials, such as wood, metal, and/or sheetrock.

As described above, the signaling device 10 is configured to transmit an IR signal that is received by the thermal imaging camera. Moreover, the signal transmitted by the signaling device 10 is indicative of a symbol or message identifying the responder organization, the status of the room, e.g. clear or not clear, and/or an indication of the specific emergency responder positioning and/or activating the signaling device 10, etc. Thus, the signaling device 10 is configured to transmit a plurality of customizable IR signals, wherein each IR signal is indicative of the message to be generated and viewed using the thermal imaging camera.

More specifically, the signaling device 10 is configured to provide visual and/or audible information to attract the attention of the emergency personnel in a hazardous environment without distracting them. Thus, the signaling device 10 is operable to generate various electrical signals that cause the IR emitter 34 to transmit information which may be utilized by the emergency personnel to both fight the fire within the building and perform rescue operations within the building. Because it is not unusual for emergency responders for multiple teams or even jurisdictions to respond to a fire or other hazardous condition, the visual information generated by the thermal imaging camera may include, for example, various oscillation patterns that indicate a specific responder team and/or symbols or objects related to the responder organization.

Figure 6:
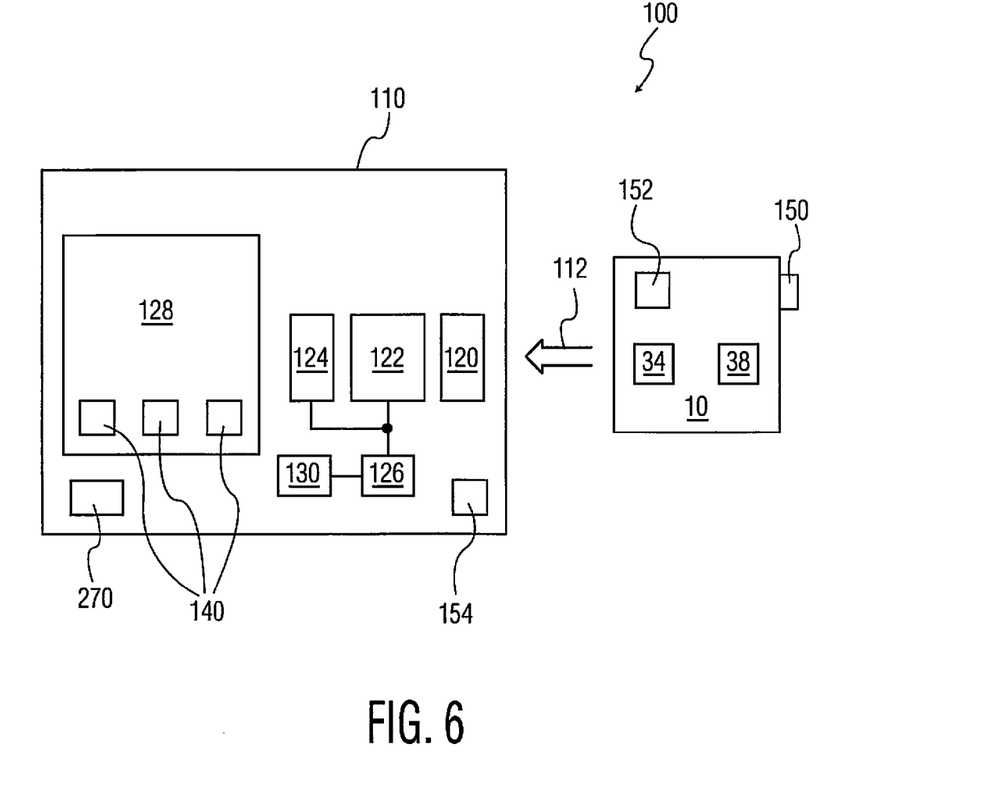
FIG. 6 is a simplified illustration of a thermal imaging system formed in accordance with various embodiments.

FIG. 6 is a simplified illustration of an exemplary thermal imaging system 100 formed in accordance with various embodiments. In the illustrated embodiment, the thermal imaging system 100 includes the signaling device 10 which, as described above, includes the IR emitter 34 and the control circuit 38. In various embodiments, the control circuit 38 may be implemented in hardware on a printed circuit board, for example, using inductors, resistors, capacitors, etc. Optionally, the control circuit 38 may be implemented as a microprocessor. As used herein, the term microprocessor may include any computer or processor-based or microprocessor-based system including systems using microcontrollers, reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "computer".

The thermal imaging system 100 also includes a thermal imaging camera 110. In various embodiments, the thermal imaging camera 110 includes an optic system or lens 120, an IR detector 122, a signal processing unit 124, a microprocessor 126, and a display 128. The thermal imaging camera 110 may also include a memory or storage device 130 for storing various instructions for operating the thermal imaging camera 110 and/or storing images generated using the thermal imaging camera 110.

In operation, the thermal imaging camera 110 utilizes an IR signal 112 received from the IR emitter 34 to generate visual images 140 that may be displayed on the display portion 128 of the thermal imaging camera 110. Optionally, the images 140 may be transmitted to a remote location and displayed to personnel operating in the remote location. For example, the images 140 may be displayed at a fire truck or other remote emergency location. Information regarding the visual images may then be transmitted back to the emergency responders located in the building. The thermal imaging camera may be handheld or attached to a portion of the emergency responders equipment such as, for example, a helmet.

In various embodiments, the IR signal 112 is configured to relay a specific piece of information to the thermal imaging camera 110. The information may include for example, a specific responder team responsible for searching a room marked by the signaling device 10, a and/or symbols or objects related to the hazardous condition. The symbols may include an exit symbol representing a building exit, a clear symbol indicating a room has been previously searched, a not clear symbol meaning the room requires searching, etc.

In the exemplary embodiment, the above described messages or symbols are embodied as different oscillation and/or steady state patterns generated by the signaling device 10. For example, an IR signal representing a steady state, or continuously on condition, may indicate an exit is being marked by the signaling device 10. An IR signal oscillating at a relatively high frequency may indicate that a room has not been searched. An IR signal oscillating at a relatively low frequency may indicate that a room has been searched. Thus, the various oscillation patterns and/or steady state pattern generated by the IR emitter 34 each represent different messages or symbols that may be used by the emergency responders.

In one embodiment, the signaling device 10 includes a multi-position switch 150 that enables a user to set the pattern to be transmitted by the IR emitter 34. For example, the multi-position switch 150 may include a first operational position that configures the signaling device 10 to transmit an IR signal having a relatively high oscillation frequency. The multi-position switch 150 may also include a second operational position that configures the signaling device 10 to transmit an IR signal having a relatively low oscillation frequency and a third operational position that configures the signaling device 10 to transmit a steady state IR signal.

In other embodiments, the signaling device 10 may include an RF receiver 152 and the thermal imaging camera 110 may include an RF transmitter 154. In operation, the emergency responders may operate the RF transmitter 154 to transmit a signal, indicating a specific pattern to be transmitted by the IR emitter 34, to the RF receiver 152. In response to the received RF signal, the signaling device 10 is configured transmit the specific pattern requested by the thermal imaging camera 110. In other embodiments, RF transmitter 154 may be a portable device that is separate from the thermal imaging camera 110. It should be realized that the signaling device 10 is configured to transmit a plurality of different IR signals, wherein each IR signal designates a specific piece of information. Thus, it should be realized that the RF transmitter 154 is configured to transmit a plurality of RF signals, having different frequencies, and the RF receiver 152 is configured to receive the RF signals and configure output from the IR emitter 34 in accordance with the received signals.

Accordingly, in various embodiments, the microprocessor 38 may include a set of instructions installed thereon. The set of instructions are configured to analyze an input received from either the RF receiver 152 and/or the switch 152. In response to the received inputs, the microprocessor 38 is configured to operate the IR emitter 34 to generate the RF signal 112 based on the instructions. The thermal imaging camera 110 then receives the IR signal 112 and generates a visual image 140 based on the received IR signal 112.

It should be noted that the various embodiments or portions thereof, such as the microprocessor 126 and/or the microprocessor 38 may be implemented in hardware, software or a combination thereof. The various embodiments and/or components, for example, the microprocessor 126 and/or the microprocessor 38 may be implemented as part of one or more computers or processors. The microprocessor 126 and/or the microprocessor 38 may include a plurality of ports to enable displays, input devices, or other user interfaces to connect to the microprocessor 126 and/or the microprocessor 38. The microprocessor 126 and/or the microprocessor 38 may include Random Access Memory (RAM) and Read Only Memory (ROM). The microprocessor 126 and/or the microprocessor 38 may further include a storage device, which may be a hard disk drive or a removable storage drive such as a solid state drive, optical disk drive, and the like. The storage device may also be other similar means for loading computer programs or other instructions into the microprocessor 126 and/or the microprocessor 38. In various other embodiments, the microprocessor 126 and/or the microprocessor 38 may also be configured to receive inputs via the Internet using for example, a Wi-Fi connection or a hard-wired connection. Additionally, the microprocessor 126 and/or the microprocessor 38 may be configured to couple to a local area network (LAN) and receive inputs from various devices either installed locally within a building or located remotely from the building. In further embodiments, the microprocessor 126 and/or the microprocessor 38 may receive inputs from a cellular phone device or any other portable touch screen device, such as a portable laptop computer, etc.

The microprocessor 126 and/or the microprocessor 38 execute a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 7:
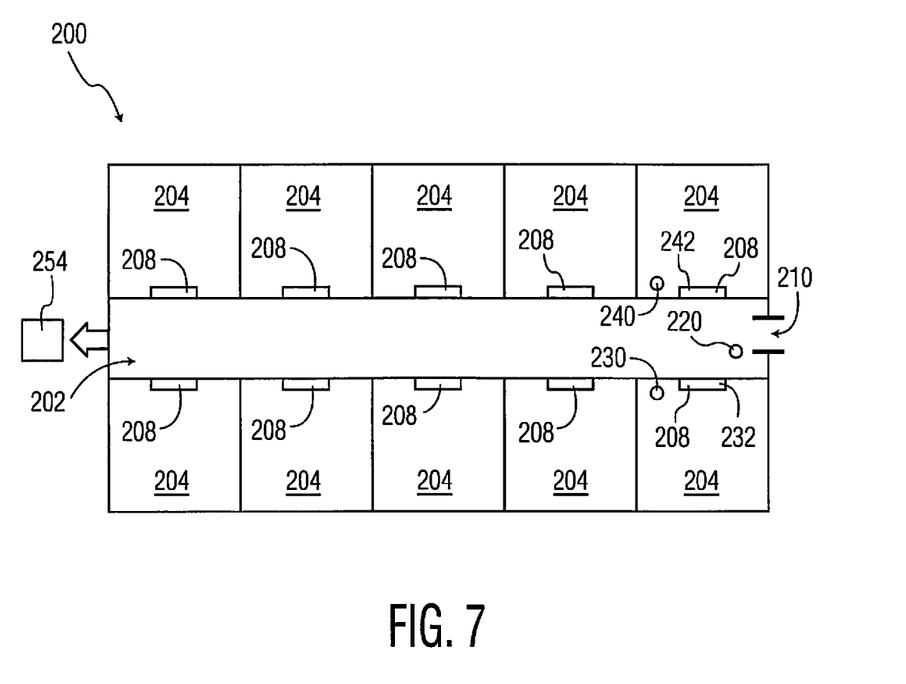
FIG. 7 is a simplified block diagram of an exemplary building formed in accordance with various embodiments.

FIG. 7 is an illustration of an exemplary building 200 that may include a plurality of signaling devices 10 therein. In the illustrated embodiment, the building 200 is shown as a single floor 202 of a single or a multi-story building. The floor 202 includes a plurality of rooms 204. A hallway 206 allows ingress and egress to and from the rooms 204. Each room 204 is accessible from the hallway 206 by a door 208.

In operation, the emergency responders may enter the building 200 via an entry/exit door 210. In some embodiments, the emergency responders may position a first signaling device 220 proximate to the entry/exit door 210. More specifically, the emergency responders may activate the signaling device 220 as described above with respect to the signaling device 10. The emergency responders may then attach the signaling device 220 to either the entry/exit door 210 or a wall or floor proximate to the entry/exit door 210. The emergency responders may then configure the signaling device 220 to transmit an IR signal that represents that the signaling device 220 is marking an exit door.

Similarly, the emergency responders may position a second signaling device 230 proximate to a door 232. The emergency responders may then activate the signaling device 230 as described above with respect to the signaling device 10. The emergency responders may then attach the signaling device 230 to either the door 232 or a wall or floor proximate to the door 232. The emergency responders may then configure the signaling device 230 to transmit an IR signal that represents that the signaling device 230 is marking a room that has been cleared, e.g. previously searched by the emergency responders and indicative that there are no fires or personnel in the room 232.

Additionally, the emergency responders may position a third signaling device 240 proximate to a door 242. The emergency responders may then activate the signaling device 240 as described above with respect to the signaling device 10. The emergency responders may then attach the signaling device 240 to either the 242 or a wall or floor proximate to the 242. The emergency responders may then configure the signaling device 240 to transmit an IR signal that represents that the signaling device 240 is marking a room that has not been cleared, e.g. the room has not been previously searched by the emergency responders or an emergency responder is currently in the room conduction a search.

In various embodiments, it should therefore be realized that a plurality of individual signaling devices 10 may be positioned within a single building or on a single floor. It may therefore be desirable to enable persons located remotely from the building 200 to visualize the location of each of the signaling devices 10, and the information being output by the signaling devices 10 to provide a coordinated response to extinguishing fires and rescuing personnel within the building 300.

Accordingly, and as shown in FIG. 1, the signaling device 10 may include a global positioning system (GPS) sensor 250 that transmits a signal indicating a current position of the signaling device 10. In operation, the signal may also be used to indicate a proximate location of the emergency responder that installed and/or activated the signaling device 10. For example, assume that an emergency responder is tasked with responding to the hazardous condition on the floor 202 shown in FIG. 7. As described above, the emergency responder may position the signaling device 240 outside of the room 242 indicating that the room is not cleared and the emergency responder may be within the room 242. Subsequently, remote personnel lose contact with the emergency responder. In this case, the remote personnel have a visual indication via the GPS sensors 250 that show the path the emergency responder was traversing through the floor 202 and also a proximate location of a room that was previously being searched by the emergency responder prior to losing contact with the remote personnel.

In further embodiments, the signaling device 10 may also include a temperature sensor 252 (shown in FIG. 1) that is configured to automatically activate the IR emitter 34, and/or transmit a separate signal when the temperature sensor 252 reaches a predetermined temperature setpoint, such as for example, 150 degrees. In operation, when a plurality of signaling devices 10 are deployed, e.g. activated, by the first responder, the signaling devices 10 function as "breadcrumbs" to enable the first responder to identify a path either to the scene of the hazardous condition and/or to a safe location away from the hazardous condition. The temperature sensors 252 also may be utilized as part of a building alarm system 254 (shown in FIG. 7) that provide a visual or audible indication at the alarm system 254 that, for example, a fire previously extinguished, has reactivated or there is a potential for a flashover situation to occur. Other appropriate functional devices may be included within the signaling device 10, such as gas detection sensors, audio and/or visual communication mechanisms, camera, and other like useful devices for facilitating safe operational control for first responders.

Accordingly, in various embodiments, the thermal imaging camera 110 or another remote computer may be configured to include map data 270, shown in FIG. 6 that defines a geographic map of the building 200 including the floor 202. The microprocessor 126 is then configured to map a location of each signaling device 10 to the map data 270. The map data 270 including the locations of the signaling devices 10 may then be displayed on the display 128 to facilitate coordinating a response to the hazardous conditions. The map data 270 and the locations of the signaling devices 10 may be periodically updated to provide real-time information to the emergency responders.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A portable signaling device for use in a reduced visibility environment, said signaling device comprising:
  a housing for carrying the signaling device into the reduced visibility environment, the housing having a signaling side and an attachment side, the signaling side configured to transmit an infrared signal and the attachment side configured to be secured to a structure within the environment;
  an infrared energy source located within the housing, the infrared energy source including a power source, an emitter connected to the power source, and a switching mechanism connected to the power source and the emitter; and
  a control circuit coupled to the infrared energy source for transmitting a plurality of infrared signaling patterns, each of the plurality of infrared signaling patterns corresponding to a different visual indication of a firefighting operation, the control circuit configured to:

operate the infrared energy source to transmit a first infrared signaling pattern of the plurality of infrared signaling patterns;
receive a wireless signal indicating a selection of a second infrared signaling pattern of the plurality of infrared signaling patterns; and
configure the infrared energy source to change from transmitting the first infrared signaling pattern to transmitting the second infrared signaling pattern of the plurality of infrared signaling patterns indicated in the wireless signal.

2. The signaling device of claim 1, further comprising a sensor;
the control circuit further configured to:
receive sensor data from the sensor;
compare the sensor data to a predetermined threshold; and
if the sensor data meets the predetermined threshold, operate the infrared energy source to transmit another infrared signaling pattern of the plurality of infrared signaling patterns, the other infrared signaling pattern of the plurality of infrared signaling patterns corresponding to another visual indication of a firefighting operation associated with the sensor data.

3. The signaling device of claim 1, further comprising a multi-position switch having a plurality of operational positions, each operational position configured to enable the emitter to transmit a different one of the plurality of infrared signaling patterns.

4. The signaling device of claim 1, wherein the switching mechanism includes a contact mechanism that includes a pair of contacts and an insulating device positioned between the pair of contacts, the insulating device being removable from the contact mechanism to activate the infrared energy source.

5. The signaling device of claim 1, wherein the switching mechanism includes a remotely activated radio frequency switch.

6. The signaling device of claim 1, wherein the first infrared signaling pattern of the plurality of infrared signaling patterns is transmitted at a first infrared oscillation frequency and the second infrared signaling pattern of the plurality of infrared signaling patterns is transmitted at a second different oscillation frequency different from the first oscillation frequency.

7. The signaling device of claim 1, wherein each of the plurality of infrared signaling patterns represents one selected from the group consisting of a symbol, object and number.

8. The signaling device of claim 1, wherein the attachment side includes an adhesive configured to secure the signaling device to a vertical surface.

9. The signaling device of claim 8, wherein a film is formed integrally with a removable pull tab disposed within the switching mechanism.

10. A thermal imaging system comprising:
a portable signaling device for use in a reduced visibility environment, the signaling including:
a housing for carrying the signaling device into the reduced visibility environment, the housing having a signaling side and an attachment side, the signaling side configured to transmit an infrared signal and the attachment side configured to position the housing in a given location;
an infrared energy source located within the housing, the infrared energy source including a power source, an emitter connected to the power source, and a switching mechanism connected to the power source and the emitter; and
a control circuit coupled to the infrared energy source for transmitting a plurality of infrared signaling patterns, each of the plurality of infrared signaling patterns corresponding to a different visual indication of a firefighting operation, the control circuit configured to:
operate the infrared energy source to transmit a first infrared pattern of the plurality of infrared signaling patterns;
receive a wireless signal indicating a selection of a second infrared signaling pattern of the plurality of infrared signaling patterns; and
configure the infrared energy source to change from transmitting the first infrared signaling pattern to transmitting the second infrared signaling pattern of the plurality of infrared signaling patterns indicated in the wireless signal; and
a thermal imaging camera configured to receive and display a message.

11. The thermal imaging system of claim 10, wherein the signaling device includes a global positioning system (GPS) transmitter, the thermal imaging camera configured to display a location of the signaling device based on a signal received from a GPS sensor.

12. The thermal imaging system of claim 10, wherein the signaling device includes a sensor; and
the control circuit further configured to:
receive sensor data from the sensor;
compare the sensor data to a predetermined threshold; and
if the sensor data meets the predetermined threshold, operate the infrared energy source to transmit another infrared signaling pattern of the plurality infrared signaling patterns, the other infrared signaling pattern of the plurality of infrared signaling patterns corresponding to another visual indication of a firefighting operation associated with the sensor data.

13. The thermal imaging system of claim 10, wherein the signaling device further comprises a multi-position switch having a plurality of operational positions, each operational position configured to enable the emitter to transmit a different one of the plurality of infrared signaling patterns.

14. The thermal imaging system of claim 10, wherein the switching mechanism includes a contact mechanism that includes a pair of contacts and an insulating device positioned between the pair of contacts, the insulating device being removable from the contact mechanism to activate the infrared energy source.

15. The thermal imaging system of claim 10, wherein the switching mechanism is configured to activate the infrared energy source using at least one of a magnet or a light source.

16. A method of transmitting a message in a reduced visibility environment, said method comprising:
positioning a signaling device at a first location within the reduced visibility environment, the signaling device including an infrared emitter and a control circuit coupled to the infrared emitter for transmitting a plurality of infrared signaling patterns, each of the plurality of infrared signaling patterns corresponding to a different visual indication of a firefighting operation;
activating a power source within the signaling device;
operating the infrared emitter to transmit a first infrared pattern of the plurality of infrared signaling patterns;

causing transmission, to the signaling device, of a wireless indication of a selection of a second infrared signaling pattern of the plurality of infrared signaling patterns to be transmitted by the signaling device; and the signaling device configuring the infrared emitter to change from transmitting the first infrared signaling pattern to transmitting the second infrared signaling pattern based on the wireless indication.

17. The method in accordance with claim 16, wherein inputting an indication of the selection of the infrared signaling pattern of the plurality of infrared signaling patterns further comprises inputting an indication of the second infrared signaling pattern that represents one selected from the group consisting of a symbol, object and number to be viewed at a thermal imaging camera.

18. The method of claim 16, wherein the signaling device includes a multi-position switch, said method further comprising:

positioning the switch at a first operational position to enable the signaling device to transmit a third infrared signaling pattern of the plurality of infrared signaling patterns to a thermal imaging camera; and positioning the switch at a second operational position to enable the signaling device to transmit a fourth infrared signaling pattern of the plurality of infrared signaling patterns to the thermal imaging camera, the third infrared signaling pattern of the plurality of infrared signaling patterns being different from the fourth infrared signaling pattern of the plurality of infrared signaling patterns.

19. The method of claim 16, wherein the signaling device includes a global positioning system (GPS) transmitter, said method further comprising transmitting a position of the signaling device within the environment to a thermal imaging camera using the GPS transmitter.

20. A method in accordance with claim 16, wherein activating the power source comprises removing a pull tab located between a pair to contacts to activate the power source.

* * * * *